United States Patent [19]

Müller

[11] Patent Number: 5,685,389

[45] Date of Patent: Nov. 11, 1997

[54] DRIVE OF A CROSS-COUNTRY VEHICLE

[75] Inventor: Robert Müller, Mönsheim, Germany

[73] Assignee: Dr. Ing. h.c.F. Porsche AG, Germany

[21] Appl. No.: 540,135

[22] Filed: Oct. 6, 1995

Related U.S. Application Data

[63] Continuation of Ser. No. 126,720, Sep. 27, 1993, abandoned.

[30] Foreign Application Priority Data

Sep. 26, 1992 [DE] Germany ............... 42 32 365.7

[51] Int. Cl.$^6$ ................................. B60K 17/34
[52] U.S. Cl. ................. 180/249; 180/233; 475/198; 475/225
[58] Field of Search ..................... 180/233, 248, 180/249; 475/198, 200, 202, 204, 225

[56] References Cited

U.S. PATENT DOCUMENTS

| | | | |
|---|---|---|---|
| 4,449,604 | 5/1984 | Suzuki | 180/233 |
| 4,650,202 | 3/1987 | Tsuzuki | 180/248 |
| 4,729,259 | 3/1988 | Lanzer | 180/248 X |
| 4,779,699 | 10/1988 | Hatano | 180/248 |
| 4,819,506 | 4/1989 | Matsumoto | 180/248 X |
| 4,875,978 | 10/1989 | Hiketa | 180/248 X |
| 4,884,650 | 12/1989 | Fujiki et al. | 180/248 X |
| 5,332,059 | 7/1994 | Shirakawa et al. | 180/245 X |

FOREIGN PATENT DOCUMENTS

| | | |
|---|---|---|
| 0 162 021 | 11/1985 | European Pat. Off. . |
| 3 219 216 | 6/1986 | Germany . |
| 37 27 698 | 8/1986 | Germany . |
| 3 533 143 | 5/1987 | Germany . |
| 3 714 334 | 1/1988 | Germany . |
| 4 110 104 | 10/1991 | Germany . |

*Primary Examiner*—Victor E. Johnson
*Attorney, Agent, or Firm*—Evenson, McKeown, Edwards & Lenahan & P.L.L.C.

[57] ABSTRACT

A cross-country vehicle comprising an all-wheel drive is driven by a reciprocating engine installed transversely close to the front axle and by means of a change speed transmission which is also disposed transversely in the front. From the change speed transmission, the drive torque flows onto a planetary transmission operating as a center differential. The ring gear of the planetary transmission drives the front axle; the sun gear drives a low-high change-over unit. The planetary transmission, the change-over unit and the wheel sets connected behind it are constructed such that, during the high operation, the major portion of the torque is available at the front axle, and, in the low operation, is available on the rear axle. The center differential can be locked in the high and in the low operation.

14 Claims, 2 Drawing Sheets

DRIVE OF A CROSS-COUNTRY VEHICLE

This application is a continuation of application Ser. No. 08/126,720, filed on Sep. 27, 1993, and now abandoned.

BACKGROUND AND SUMMARY OF THE INVENTION

This invention relates to a drive of a cross-country vehicle comprising an all-wheel drive and a high/low reduction gear whose engine and change-speed transmission are arranged transversely on the front axle.

In the case of a front transverse arrangement of the engine-transmission unit, the transmission output shaft is not accessible. The reduction gear must therefore be arranged behind the final drive, where, because of the high torques, it would have to be dimensioned to be so large that it could no longer be housed in the engine/front-axle area.

When driving on roads in the high operation, cross-country vehicles must have an understeering vehicle handling and avoid a swerving of the rear axle in marginal situations. During cross-country driving in the low operation, it is important to obtain a good steerability of the cross-country vehicle whose front axle is loaded by the weight of the reciprocating engine and of the change speed transmission.

It is an object of the invention to meet the requirements of directional control on the road and good steerability when driving cross-country in the low operation by a drive that can be manufactured at reasonable cost while a shiftable reduction gear is housed at the same time.

This object is achieved according to the invention by providing a change over unit for the change over from cross-country low operation to a road high operation, said change over unit being arranged in a transmission line to the rear axle, wherein the change over unit serves to transmit the majority portion of the torque to the front axle during the high operation and to the rear axle during the low operation.

If, during the high operation, the larger portion of the torque is guided to the front axle and, during the low operation, it is guided to the rear axle, the requirements of directional control and steerability of the cross-country vehicle can be optimally met in both cases.

A remaining problem to be solved by especially preferred embodiments of the invention will then be the design and the physical arrangement of the all-wheel drive and of the change-over unit via which these high torques are to be guided to the rear axle. This problem is addressed and solved by providing an arrangement wherein the center differential is connected between the change speed transmssion and the change-over unit, wherein only a fraction of the transmission output torque is transmitted to the change-over unit, and wherein a torque transmission to the desired higher value takes place in gear sets which are connected behind the change-over unit.

Other objects, advantages and novel features of the present invention will become apparent from the following detailed description of the invention when considered in connection with the accompanying drawings.

DETAILED DESCRIPTION OF THE DRAWINGS

Figure 1:
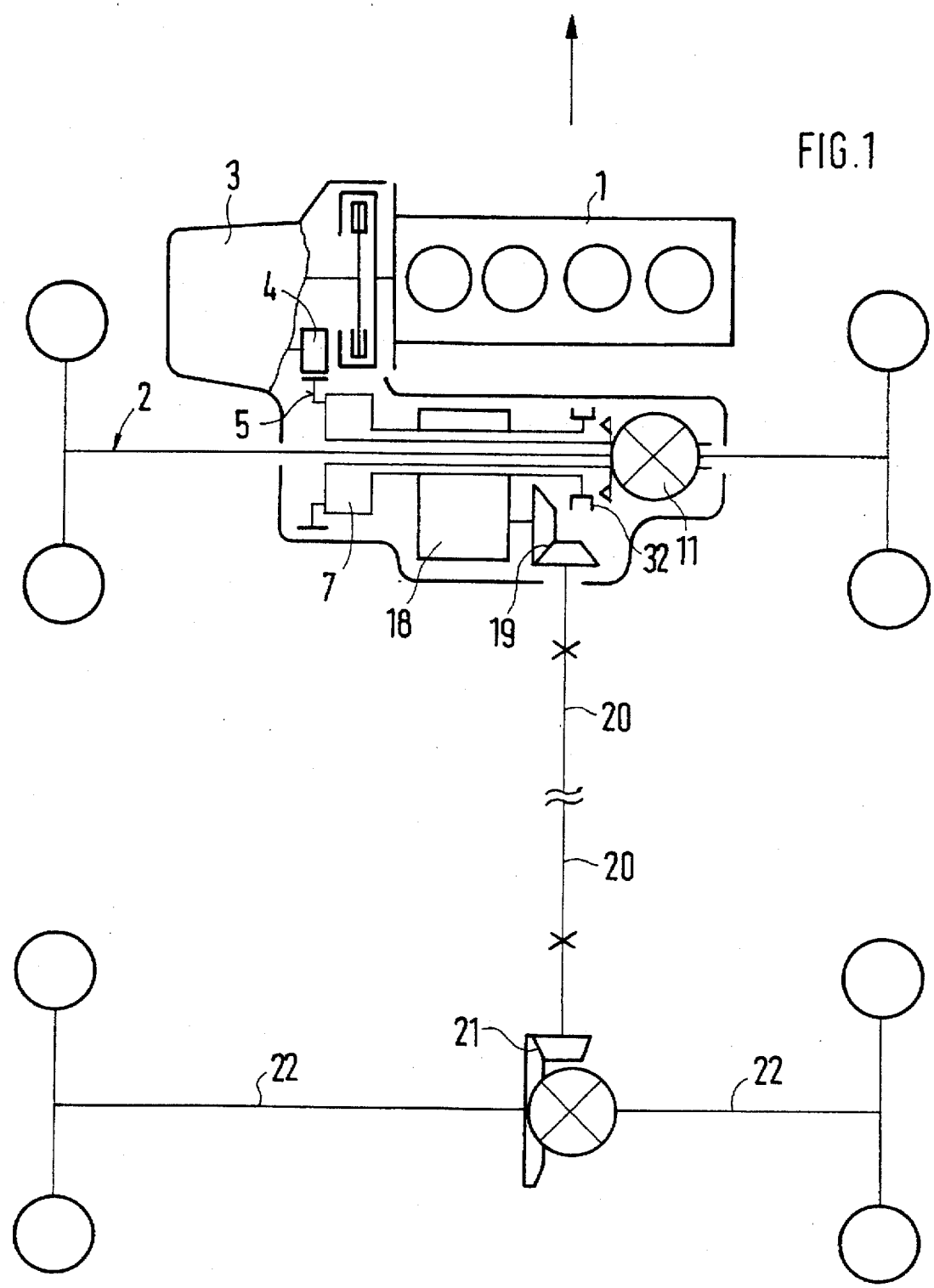
FIG. 1 is a schematic view of a drive of a cross-country vehicle, constructed according to a preferred embodiment of the present invention.
Figure 2:
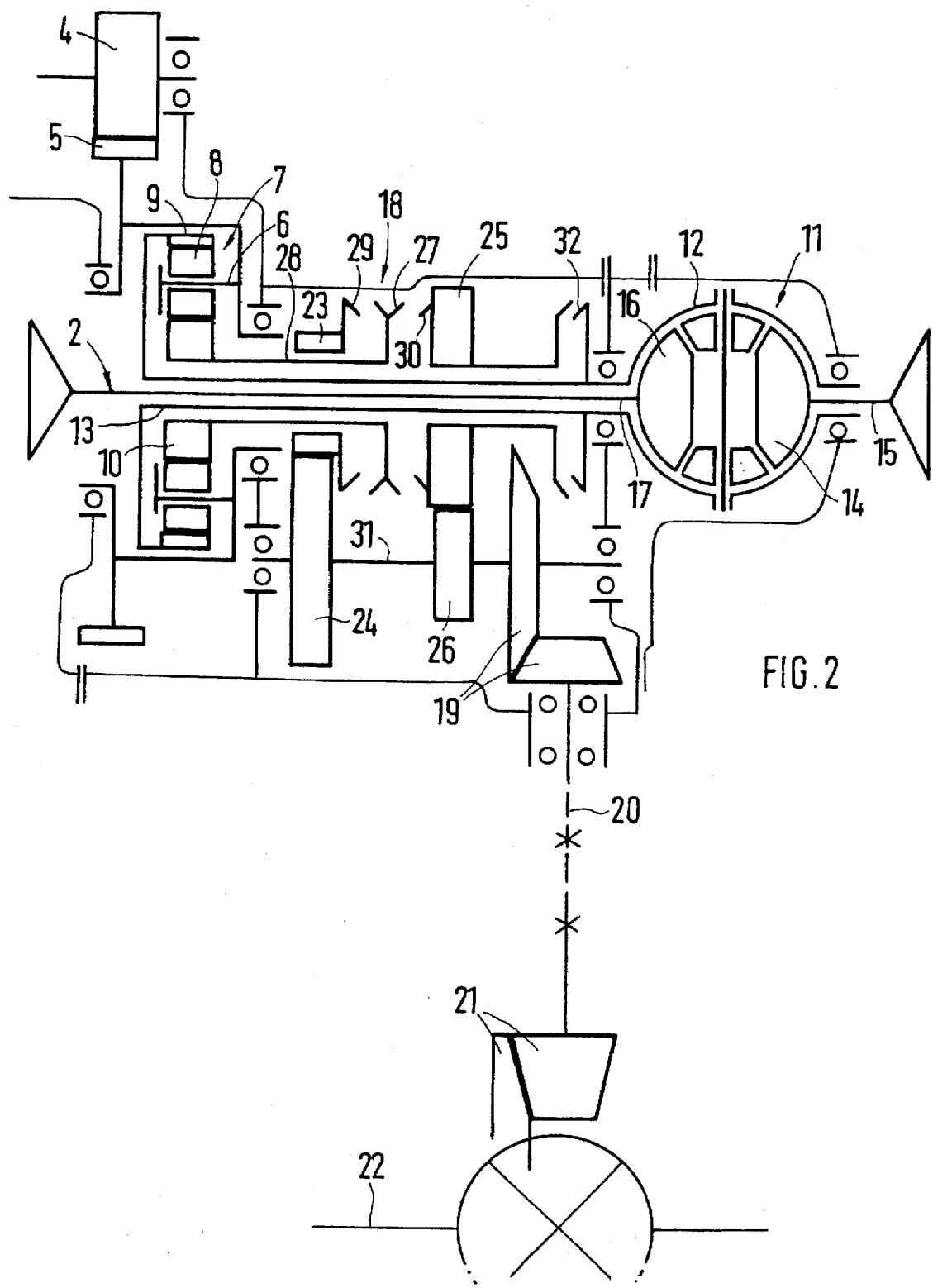
FIG. 2 is a schematic view of the arrangement of the wheel sets and the clutches in the case of the drive according to FIG. 1.

By means of a reciprocating engine 1 which is arranged transversely with respect to the longitudinal dimension of the cross-country vehicle close to the front axle 2, a change-speed transmission 3 is driven which is also arranged transversely. The gear 4 of the change-speed transmission 3 mates with a master gear 5 which drives a planet carrier 6 of a planetary transmission 7 acting as a center differential. The planet gears 8 disposed on the planet carrier 6 mate with a ring gear 9 and a sun gear 10.

The front axle 2 is driven by the ring gear 9 by way of a front axle differential 11 which is constructed of four bevel gears. For this purpose, the housing 12 of the differential 11 is connected with the ring gear 9 by way of an internal hollow shaft 13. The right axle drive shaft 15 is driven by one bevel gear 14 arranged on the front axle 2; the left axle drive shaft 17, which penetrates the hollow shaft 13 along its whole length, is driven by the other bevel gear 16 which is disposed coaxially to bevel gear 14. The tooth number of the diameters of the ring gear 9 is approximately twice as large as in the case of the sun gear 10. Therefore, approximately two thirds of the drive torque supplied by the change-speed transmission 3 is guided to the front axle during high operation. One third of the drive torque is fed by the sun gear 10 to the change-over unit 18 which drives, by way of a forward bevel gear drive 19, a propeller shaft 20, which extends into the longitudinal direction of the vehicle, and the rear axle 22 by way of a rear bevel gear drive 21.

The change-over unit 18 comprises a low gear pair 23, 24, a high gear pair 25, 26 and a coupling sleeve 27 disposed between the two gear pairs. By way of an external hollow shaft or transmission member 28, the coupling sleeve 27 is connected with the sun gear 10. According to the position of the longitudinally displaceable coupling sleeve, the loose gear 23 of the low gear pair can be connected with the sun gear 10 in a torque-transmitting manner by the closing of clutch 29, or the loose gear 25 of the high gear pair can be connected with the sun gear 10 in a torque transmitting manner by the closing of the clutch 30. The fixed gears 24 and 26 of the two gear pairs are disposed on an auxiliary shaft 31 which is in parallel to the front axle 2 and which introduces the torque into the forward angle drive 19. The torque ratio of the output torque to the input torque in the low gear pair amounts to approximately 2:1; in the high gear pair to approximately 0.5:1; in the forward bevel gear drive to approximately 0.5:1; in the rearward bevel gear drive to approximately 4:1.

The front axle also receives approximately two thirds of the torque existing at the master gear 5 during high operation. During the low operation, approximately two thirds of this torque flow to the rear axle; thus, approximately twice as much as to the front axle. During the high operation, the rear axle receives approximately one third of the torque; thus approximately half as much as the front axle.

In the high operation, when the rotational speeds of the front axle and the rear axle are the same, the planetary transmission rotates as a block. In contrast, in the low operation, it operates as a torque-splitting running transmission.

The planetary transmission can therefore not be locked directly but only indirectly. In order to implement an all-wheel lock on it, a locking clutch 32 is mounted between the loose wheel 25 of the high gear pair and the internal hollow shaft 13. For this purpose, an externally controllable clutch or an automatically closing clutch which responds to the rotational speed difference between the front axle and the rear axle may be provided. During the low operation, only the locking torques generated according to the degree of lock flow by way of the high gear pair 25, 26.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A drive of a cross-country vehicle, comprising:

a reciprocating engine installed transversely of the vehicle adjacent a vehicle front axle;

an also transversely installed change-speed transmission by means of which the front axle and a rear vehicle axle are driven simultaneously by way of a center differential, and a change-over unit for change over from a cross-country low operation to a road high operation, said change-over unit being operably arranged in a transmission line between the center differential and the rear axle, said change-over unit being drivingly connected to said center differential via a tranmission member, wherein the change-over unit includes selectably engageable gear sets operable to control simultaneous distribution of torque to both the front and rear axles with a majority portion of torque transmitted to the front axle during the high operation and to the rear axle during the low operation.

2. A drive according to claim 1, wherein the center differential is operably connected in between the change speed transmission and the change-over unit, wherein said center differential is operable to transmit only a fraction of the transmission output torque to the change-over unit, and wherein a torque transmission to the rear axle takes place in the gear sets of the change-over unit.

3. A drive according to claim 2, wherein a planetary transmission is used as the center differential, a planet carrier of the planetary transmission being driven by the change-speed transmission, a ring gear of the planetary transmission driving the front axle and a sun gear of the planetary transmission diving the change-over unit.

4. A drive according to claim 1, wherein the front axle extends through said transmission member, and wherein a loose gear and a coupling sleeve of the change-over unit, as well as a front axle differential, are arranged on the front axle, a housing of the front axle differential being driven by a ring gear by means of a shaft which penetrates the center of said transmission member.

5. A drive according to claim 1, wherein a planetary transmission is used as the center differential, a planet carrier of the planetary transmission being driven by the change-speed transmission, a ring gear of the planetary transmission driving the front axle and a sun gear of the planetary transmission driving the change-over unit, and wherein the change-over unit comprises two gear pairs consisting of one loose gear and one fixed gear respectively, and of a coupling sleeve which is arranged in a center location between the loose gears and is selectively connectable with the loose gears while transmitting torque, the coupling sleeve being non-rotatable with respect to the sun gear.

6. A drive according to claim 5, wherein the center differential is operably connected in between the change speed transmission and the change-over unit, wherein said center differential is operable to transmit only a fraction of the transmission output torque to the change-over unit, and wherein a torque transmission to the rear axle takes place in the gear sets of the change-over unit.

7. A drive of a cross-country vehicle comprising:

a reciprocating engine installed transversely of the vehicle adjacent a vehicle front axle;

an also transversely installed change-speed transmission by means of which the front axle and a rear vehicle axle are driven simultaneously by way of a center differential, and a change-over unit for change over from a cross-country low operation to a road high operation, said change-over unit being operably arranged in a transmission line between the center differential and the rear axle, wherein the change-over unit is operable to control distribution of torque to the front and rear axles with a majority portion of torque transmitted to the front axle during the high operation and to the rear axle during the low operation, wherein the center differential is operably connected in between the change speed transmission and the change-over unit, wherein said center differential is operable to transmit only a fraction of the transmission output torque to the change-over unit, wherein a torque transmission to the rear axle takes place in gear sets of the changeover unit, wherein a planetary transmission is used as the center differential, a planet carrier of the planetary transmission being driven by the change-speed transmission, a ring gear of the planetary transmission driving the front axle and a sun gear of the planetary transmission driving the change-over unit, and wherein the change-over unit comprises two gear pairs consisting of one loose gear and one fixed gear respectively, and of a coupling sleeve which is arranged in a center location between the loose gears and is selectively connectable with the loose gears while transmitting torque, the coupling sleeve being non-rotatable with respect to the sun gear.

8. A drive according to claim 7, wherein the loose gears and the coupling sleeve are arranged concentrically with respect to the front axle, and wherein the fixed gears are arranged on an auxiliary shaft which is parallel with respect to the front axle.

9. A drive according to claim 8, wherein the auxiliary shaft drives the rear axle by way of a forward bevel gear drive, a propeller shaft, and a rearward bevel gear drive.

10. A drive according to claim 9, wherein the gear pair corresponding to high operation, the forward bevel gear drive, and the rearward double gear drive are configured such that, during high operation, approximately two-thirds of the transmission output torque is available at the front axle and approximately one-third of the transmission output torque is available at the rear axle.

11. A drive according to claim 10, wherein the torque ratio of the output torque to the input torque in the low gear pair is 2:1, in the high gear pair is approximately 0.5:1, in the forward bevel gear drive is approximately 0.5:1, and in the rearward bevel gear drive is approximately 4:1.

12. A drive according to claim 9, wherein the gear pair corresponding to low operation, the forward bevel gear drive, and the rearward double gear drive are configured such that, during low operation, approximately one-third of the transmission output torque is available at the front axle and approximately two-thirds of the transmission output torque is available at the rear axle.

13. A drive according to claim 12, wherein the torque ratio of the output torque to the input torque in the low gear pair is 2:1, in the high gear pair is approximately 0.5:1, in the forward bevel gear drive is appoximately 0.5:1, and in the rearward bevel gear drive is approximately 4:1.

14. A drive according to claim 13, wherein the center differential can be controlled indirectly by the closing of a locking clutch which is arranged between a loose wheel of the high gear pair and a hollow front axle drive shaft.

* * * * *